I. JOHNSON.
AUTOMOBILE TRUCK.
APPLICATION FILED JAN. 3, 1918.
1,410,921. Patented Mar. 28, 1922.
4 SHEETS—SHEET 1.
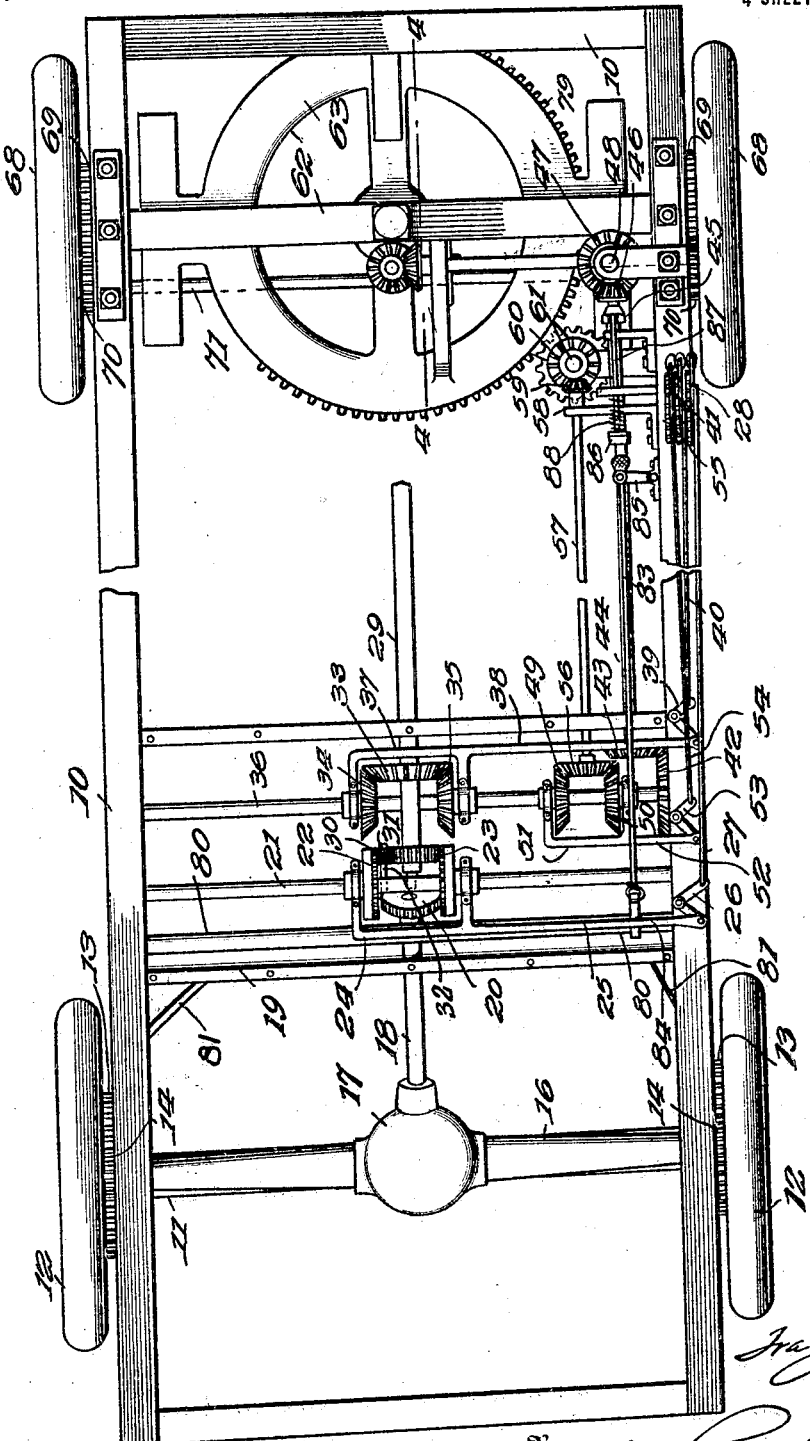
Fig. 1.
Inventor
Ira Johnson
By 
his Attorneys

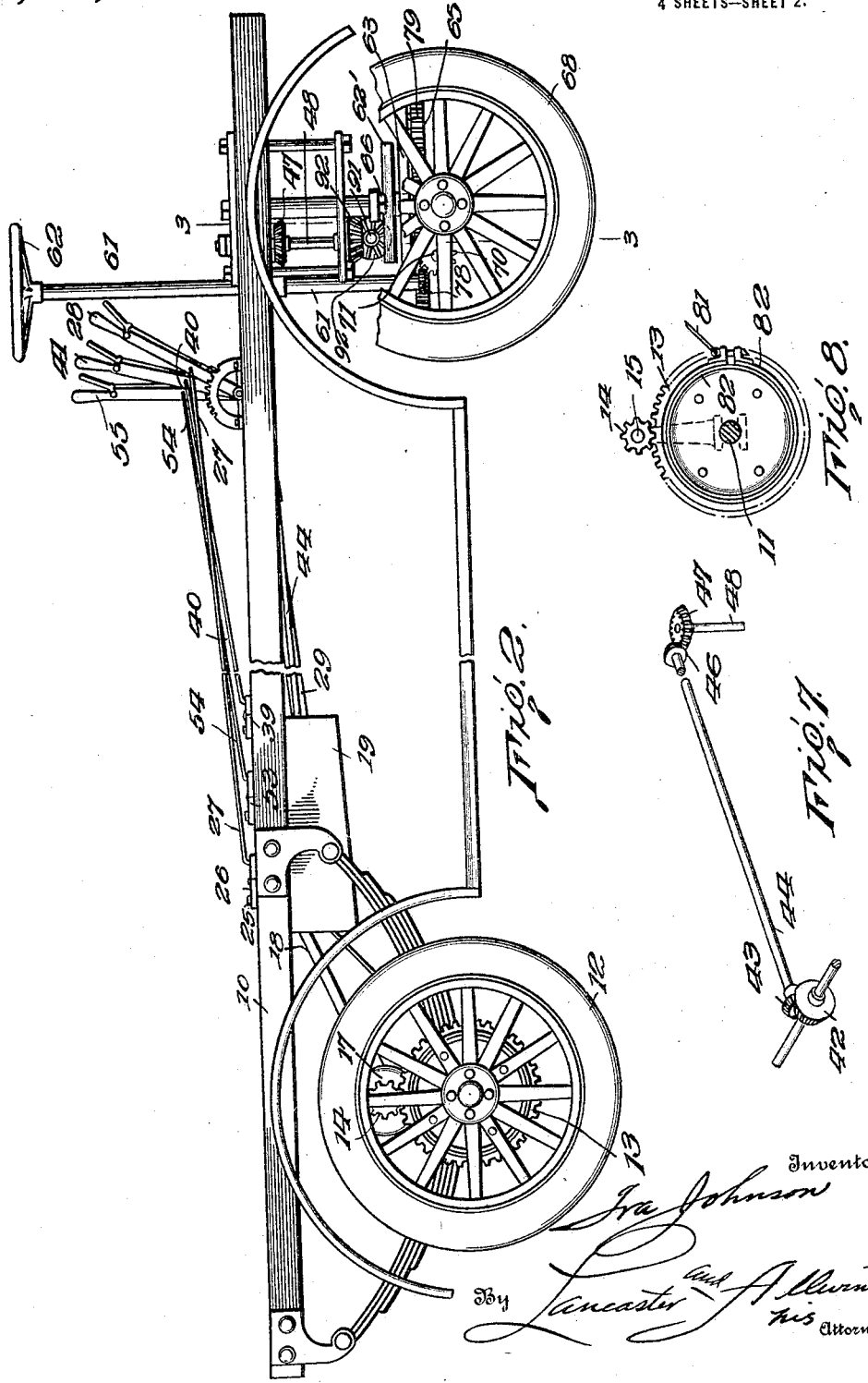

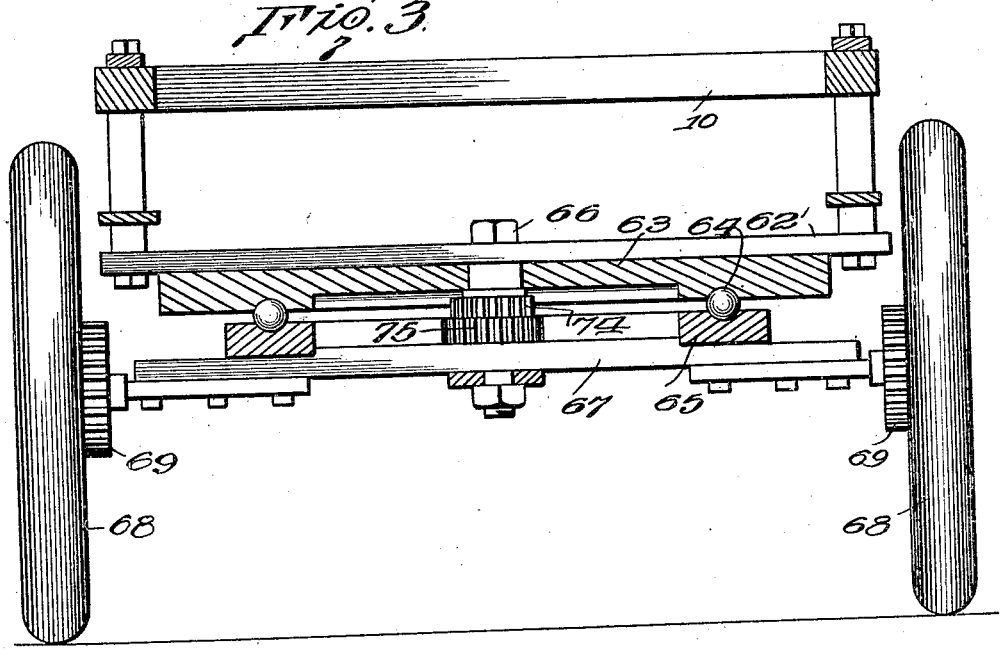
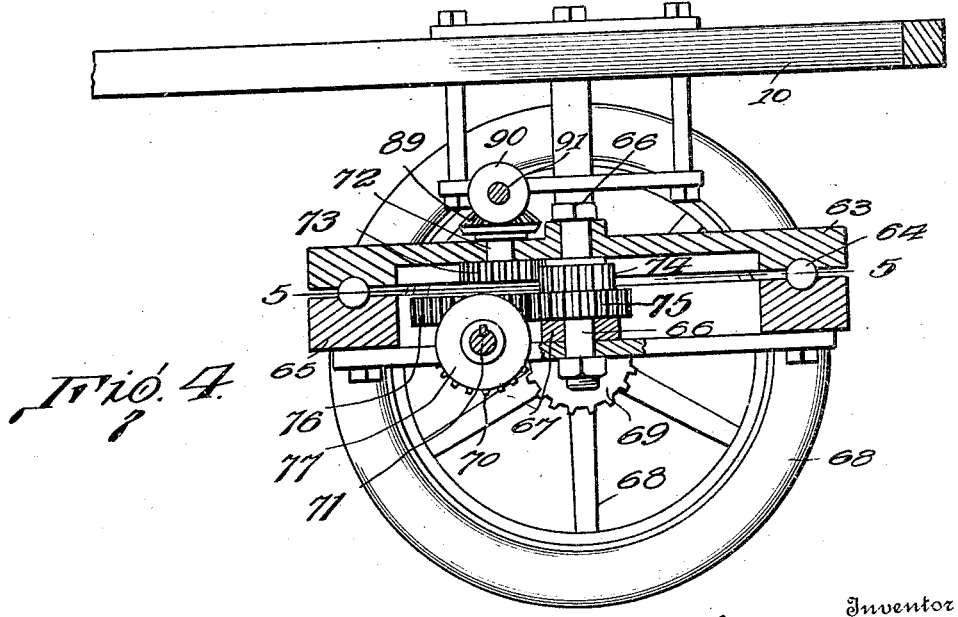

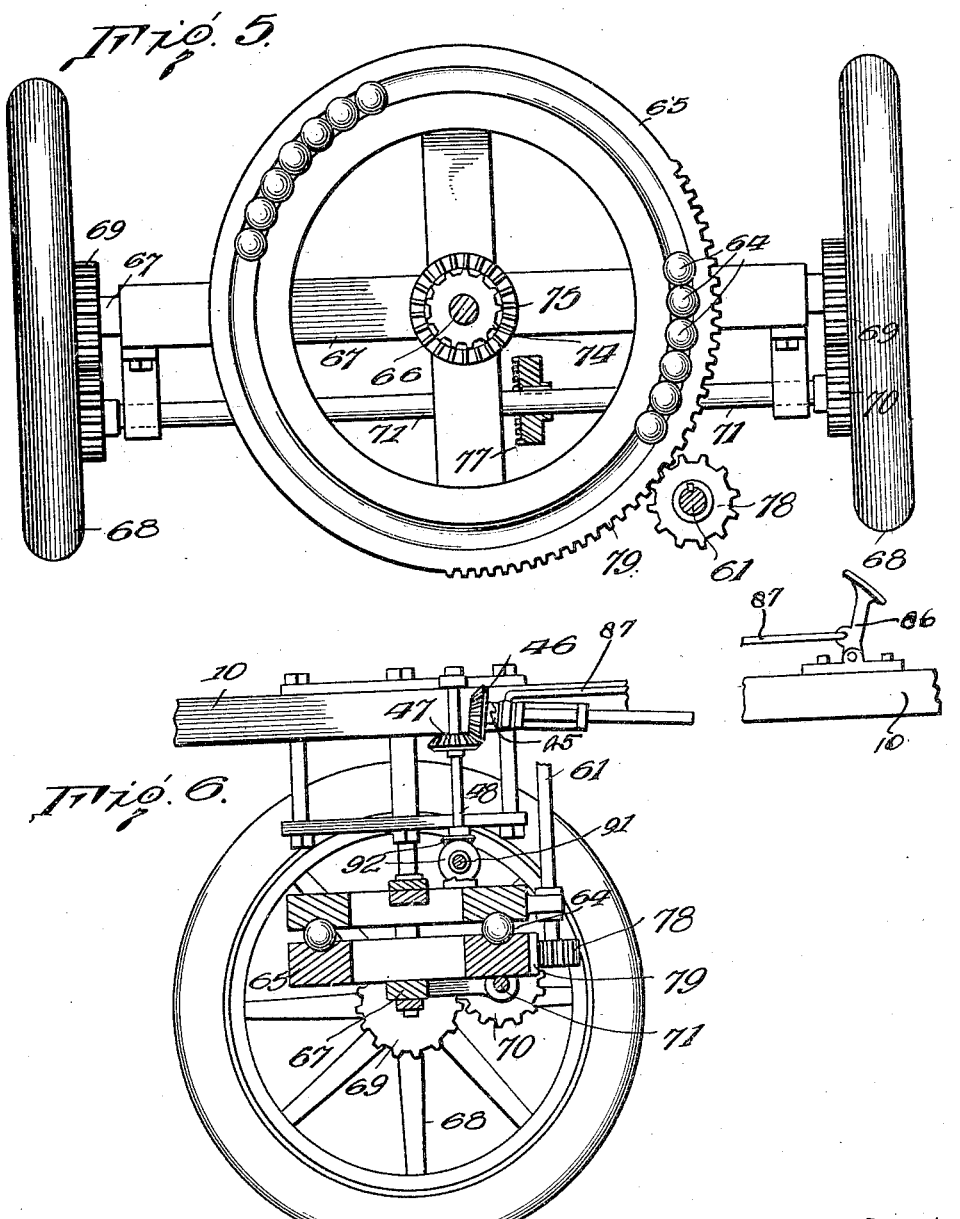

UNITED STATES PATENT OFFICE.

IRA JOHNSON, OF CHICAGO, ILLINOIS.

AUTOMOBILE TRUCK.

1,410,921.  Specification of Letters Patent.  Patented Mar. 28, 1922.

Application filed January 3, 1918. Serial No. 210,219.

*To all whom it may concern:*

Be it known that I, IRA JOHNSON, a citizen of the United States, and a resident of Chicago, in the county of Cook and State of Illinois, have invented certain new and useful Improvements in an Automobile Truck, of which the following is a specification.

The present invention relates to motor vehicles, and has more particular reference to an improved driving and steering mechanism therefor.

An object of the present invention is to provide a driving and steering mechanism for motor vehicles of particularly the heavy and long type, such as trucks and the like, and wherein the front steering carrier wheels may be power driven when desired and are normally free from the motor so that the vehicle may, under ordinary circumstances, be propelled in the usual manner by driving the rear wheels only.

Another object of this invention is to provide means for manually turning the steering carrier wheels into the desired angle for steering the vehicle, and also to provide power means for adjusting the steering carrier wheels when the resistance is greater than may be overcome by manual power.

A further object of the invention is to provide an improved fifth wheel structure admitting of the short turning of the truck or vehicle in restricted places, and embodying certain details of the above referred to mechanism, and which admits the use of a relatively stationary and independent bolt; providing a strong and durable structure.

The above, and various other objects and advantages of this invention will be in part described, and in part understood, from the following description of the present preferred embodiment, the same being illustrated in the accompanying drawings wherein:—

Figure 1 is a top plan view of the chassis of a motor vehicle showing the improved driving and steering mechanism of this invention applied thereto.

Figure 2 is a side elevation of the same.

Figure 3 is a transverse section through the front end of the vehicle taken substantially on the plane indicated by the line 3—3 of Fig. 2.

Figure 4 is a longitudinal section through the front end of the vehicle taken substantially on the plane indicated by the line 4—4 of Fig. 1, looking toward the left hand side of the structure.

Figure 5 is a horizontal section through the fifth wheel structure taken on the line 5—5 of Fig. 4.

Figure 6 is a longitudinal section through the front end of the vehicle taken substantially on the plane indicated by the line 4—4, and looking toward the right hand side of the structure.

Figure 7 is a fragmentary perspective view of the power steering transmission.

Figure 8 is a detail fragmentary view of the inner side of one of the rear wheels, showing the drive gear and the brake applied thereto.

Referring to these drawings, 10 designates the frame of a motor vehicle which may be of any approved construction and design, and which in the present instance is shown as of elongated rectangular form. The frame 10 is supported at its rear end upon a transverse dead rear axle 11 upon the opposite ends of which are mounted rear carrier wheels 12 of the usual construction. Each carrier wheel 12 is provided at its inner side with a drive gear wheel 13 which meshes with a pinion 14 mounted upon the end of a drive shaft 15. A housing 16 encloses the drive shaft 15 which is provided intermediate its ends with differential gearing 17 of any approved type. The housing 16 is supported in any suitable manner upon the rear axle 11 and is preferably arranged above the same to provide ample clearance beneath the axle. From the differential gearing 17, a drive shaft 18 projects forwardly and upwardly into the frame 10, and has bearing near its forward end in the rear wall of a transmission casing 19, and is provided within the casing 19 with a spur gear wheel 20.

Arranged in the casing 19 and extending transversely across the frame 10 is a supporting shaft 21 having slidably mounted spur gear wheels 22 and 23 thereon which are connected together by a yoke 24 adapted to slide the gear wheels 22 and 23 simultaneously and hold the same in suitably spaced apart relation from the opposite sides of the gear wheel 20. The yoke 24 is provided with an arm 25 which extends preferably to one side of the frame 10 and has pivotal connection with a bell-crank lever 26 secured to a connecting rod 27 which extends forwardly along the side of the frame and is suitably connected to a hand controlled lever 28.

Suitably mounted in the frame 10, and longitudinally thereof is a drive shaft 29, which is adapted to be turned by the engine of the vehicle. The rear end of the drive shaft 29 projects into the casing 19 and is provided therein with a spur gear wheel 30 upon its extremity adapted to lie between the edge portions of the gear wheels 22 and 23. An idler pinion 31 is mounted upon a bracket 32 which projects from the transverse shaft 21 and meshes with the gear wheel 30 and the adjacent gear wheel 22 of the shaft 21 for rotating the gear 22 in the same direction as the gear 23.

The drive shaft 29 is also provided, in spaced relation from the gear wheel 30, with a second gear wheel 33 adapted to alternately mesh with gear wheels 34 and 35 slidably mounted upon a second transverse shaft 36 projecting through the casing 19. The gear wheels 34 and 35 are connected together by a yoke 37 provided with an arm 38 extending to the side of the frame and having pivotal connection with a bell-crank lever 39 to which a connecting rod 40 is secured, the latter being pivotally connected at its forward end to a second hand lever 41.

The transverse shaft 36 is provided at one side of the frame 10 with a gear wheel 42 which meshes with a pinion 43 carried upon a forwardly extending front drive shaft 44. The forward end of the shaft 44 is connected by a clutch 45 to a pinion 46, the latter meshing with a gear wheel 47 fixed upon a vertical shaft 48 journaled in the adjacent side of the frame.

Within the casing 19 there is also disposed a pair of slidable gear wheels 49 and 50 connected together by a yoke 51 having an arm 52 extending to the sides of the frame 10 and connected by a bell-crank lever 53 to a connecting rod 54 which extends forwardly and is connected to a third hand lever 55. Arranged between the gear wheels 49 and 50 is a pinion 56 which is carried upon a steering shaft 57, which extends forwardly along the frame 10 and is supported near its forward end in a bracket 58. A pinion 59 is carried upon the forward end of the steering shaft 57 and meshes with a beveled gear wheel 60 which is mounted upon a steering post 61. The post 61 is suitably journaled in the frame 10 and extends above the same to the desired height and is provided upon its upper end with a hand wheel 62 admitting of the turning of the post 61 by hand.

The forward end of the frame 10 is supported upon an improved fifth wheel structure, the same comprising a transverse body bolster 62' supported beneath the frame 10 and to which is secured the upper circular frame or ring of the fifth wheel. The upper ring 63 is in the form of a plate of circular form and preferably having a concentric raceway or groove in its lower face adapted to receive bearings 64. A lower ring or frame 65 is also provided and has in its upper face an annular raceway in which the bearings 64 engage for supporting the fifth wheel sections one upon the other. A king bolt or pin 66 is secured axially through the frames 63 and 65 to hold the same together and admit of the free relative turning thereof. The lower ring frame 65 carries a transversely extending dead axle 67 upon the opposite ends of which are mounted the steering carrier wheels 68. The wheels 68 have secured to their inner sides drive gears 69 which mesh with drive pinions 70 fixed upon the opposite ends of a shaft 71 which is journaled in the under side of the lower ring frame 65. The upper ring frame 63 has journaled therein, a vertically extending stub shaft 72, provided with a spur gear 73 on its lower end adapted to mesh with a spur gear 74 rotatably mounted upon the king bolt 66. A second gear wheel 75 is mounted upon the king bolt 66 and is connected to the gear wheel 74 to turn therewith, and meshes with a gear wheel 76 mounted for rotation in the lower ring frame 65. The shaft 71 is provided, at one side of the gear wheel 76, with a gear wheel 77 which meshes with the gear wheel 76 to transmit motion thereof to the steering carrier wheels 68. The upper end of the stub shaft 72 has a beveled pinion 89 which meshes with a correspondingly formed pinion 90 carried upon a laterally extending shaft 91 connected to the vertical drive shaft 48 by bevel gears 92.

The steering post 61 is provided upon its lower end with a spur pinion 78, which intermeshes with a segmental rack 79 formed upon the adjacent side of the lower fifth wheel frame 65, the rack 79 extending over the periphery of the frame 65 a distance sufficient to admit the turning of the front axle 67 into a relatively sharp angle.

A brake rod 80 may also be mounted upon the frame 10 to extend through the casing 19 as shown, the rod 80 being connected at opposite ends by rods 81 to the brake bands 82 on the rear wheels. A connecting rod 83 is pivotally attached to the brake rod 80 through the intermediacy of a radial arm 84, and extends forwardly to a pedal 85, arranged in position to be engaged by the foot of the operator for applying the brake.

The clutch 45 may be operated by a pedal 86 connected to the clutch 45 by a rod 87 and normally held in position for releasing the clutch by a spring 88.

In operation, when the main drive shaft 29 is turning, and it is desired to drive the vehicle in one direction, it is only necessary to operate the handle 28 and shift the yoke 24 in the desired direction to engage one of the gear wheels 22 or 23 with the driving mechanism. The hand lever 28 may be shifted in an opposite direction to change the relation of the gear wheels 22 and 23 with respect to the driving mechanism.

The motor vehicle may be manually steered by means of the wheel 62. If, however, it is desired to turn the front axle 67 by power, it is only necessary to operate the handle 41 to shift the yoke 51 and engage one of the gear wheels 49 or 50, dependent upon the direction in which the axle 67 is to be turned, to connect the steering shaft 57 to the transverse shaft 36 and thus drive the steering post 61 in the desired direction.

The front drive shaft 44 rotates at all times, and when it is desired to connect the front wheel transmission means to the drive shaft 44, it is only necessary to move the clutch pedal 86 forwardly and close the normally opened clutch 45. When this is done, the front wheels are thus power-driven as well as the rear wheels. The advantage of this construction and arrangement is that when the vehicle is turned upon a relatively short radius, the front wheels may be driven in order to turn the vehicle. By driving the front wheels in this manner, the power may be distributed over the four wheels and thus facilitate the driving of the vehicle over sand and mud.

It is of course understood that various changes and modifications may be made in the details of construction and design of the above specifically described embodiment of this invention without departing from the spirit thereof, such changes and modifications being restricted only by the scope of the following claim.

I claim:

In a motor vehicle the combination of a rectangular frame, a drive shaft in said frame, front and rear wheels, manually controlled steering means for the front wheels, a transmission mechanism disposed between the drive shaft and the rear wheels, a fifth wheel mounted on the forward end of the frame, a driving axle carried by said fifth wheel, forwardly extending shafts connecting the transmission mechanism and said driving axle, means adapted to actuate said transmission mechanism for imparting driving power to said driving axle, and manually controlled means mounted upon the forward end of the frame for regulating the connection between the forwardly extending shafts and the driving axle.

IRA JOHNSON.